United States Patent

Taniguchi et al.

[11] Patent Number: 5,177,518
[45] Date of Patent: Jan. 5, 1993

[54] FILM CARTRIDGE SUPPORT IN A CAMERA

[75] Inventors: Toshihiko Taniguchi; Akio Miyata; Tomohiro Higuchi; Hunichi Tanii, all of Osaka, Japan

[73] Assignee: Minolta Camera Kabushiki Kaisha, Osaka, Japan

[21] Appl. No.: 352,489

[22] Filed: May 16, 1989

[30] Foreign Application Priority Data

May 16, 1988 [JP] Japan .................. 63-118662
May 16, 1988 [JP] Japan .................. 63-118663

[51] Int. Cl.⁵ .......................... G03B 19/10
[52] U.S. Cl. .................. 354/174; 354/288
[58] Field of Search .......... 354/174, 175, 288, 275

[56] References Cited

U.S. PATENT DOCUMENTS 4,024,557 5/1977 Aoyama et al. ............ 354/275
4,363,547 12/1982 Hashimoto et al. ......... 354/275 X

FOREIGN PATENT DOCUMENTS 38-11828 6/1963 Japan .
48-86830 10/1973 Japan .
54-106830 7/1979 Japan .
55-125633 9/1980 Japan .
55-141120 10/1980 Japan .
56-22185 5/1981 Japan .
59-77136 5/1984 Japan .
60-178830 11/1985 Japan .

Primary Examiner—L. T. Hix
Assistant Examiner—Khanh Dang
Attorney, Agent, or Firm—Burns, Doane, Swecker & Mathis

[57] ABSTRACT

A film cartridge support in a photographic camera is provided in a film chamber which holds a film cartridge. The support includes a stopper for limiting the rotation of the film cartridge around a shaft of the film cartridge, and the stopper is supported for rotation in a direction approximately parallel to a surface of a film set on the camera. A modification of the support can include a block portion on the support extending across the lower end of the film chamber to prevent incorrect insertion of the film cartridge into the film chamber. A cut portion which is large enough to allow insertion of an operator's finger may be provided at the top end of the film chamber to allow easier insertion and removal of the film cartridge into and from the film chamber.

13 Claims, 14 Drawing Sheets

FILM CARTRIDGE SUPPORT IN A CAMERA

BACKGROUND OF THE INVENTION

1. Field of the Invention

The present invention relates to a film cartridge support in a film chamber of a photographic camera for supporting and retaining a film cartridge in position inside the film chamber.

2. Description of the Related Art

As is well known to those skilled in the art, film cartridges generally comprise an open-ended slit cylindrical body, annular end lids closing the opposite ends of the slit cylindrical body, a tubular spool housed within the slit cylindrical body with its opposite ends protruding axially outwardly of the split cylindrical body through respective openings on the end lids, and a length of photosensitive film having one end secured to the spool and the other end used as a leader for engagement with a film winding spool in the camera. An intermediate portion of the film is generally wound around the spool within the split cylindrical body, and a film exit slit is defined in the split cylindrical body for drawing the length of film therethrough.

In most of the latest cameras, the film is automatically wound by a motor. In the camera of this type, when the film is used through to the last available frame, i.e., the film is wound to its end, a film rewinding force is directly applied to the film cartridge through the film, causing the film cartridge to be forcibly rotated within the film chamber. Due to this, a mouthpiece of the film cartridge is displaced angularly and thereby generates an extremely heavy load upon rewinding of the film. This requires a large rewinding force, and can cause problems because the film can not be rewound smoothly.

Also, in order to make a camera compact, attempts have been made recently to reduce the distance between an exposure window in the camera and a film chamber for accommodating the film cartridge. This reduction makes it difficult to keep each frame of the film flat at the exposure window.

To avoid these inconveniences, the rotation of the film cartridge must be limited to allow smooth winding and rewinding of the film and to keep the film lying flat on the exposure window. To do so, a stopper means is installed on an inside wall of the film chamber. The stopper means is engagable with the film cartridge mouthpiece, and it thereby limits rotation of the film cartridge.

FIG. 1 is a schematic rear elevational view showing an internal construction of the conventional camera 1.

In the camera 1 constructed as shown in FIG. 1, because of the presence of both of a rewinding fork 8 and a stopper 9 for regulating the rotation of the film cartridge, the film cartridge can not be inserted into a film chamber 2 from the back of the camera in a direction generally orthogonal to the back surface of the camera, and it has to be inserted thereinto generally diagonally from below at the back of the camera.

In order to overcome the above disadvantages, there has been proposed a camera shown in FIG. 2. As shown in FIG. 2, the camera body comprises a bottom cover 11 having a cut portion 11a, and a back cover 12 having a projected portion 12a adapted to cover up the cut portion 11a in the bottom cover 11 for shielding external light incident inside of the camera when the back cover 12 is in position to close the camera back. In the camera, since the cut portion 11a is formed in the bottom cover 11, the film cartridge can be inserted into the film chamber easily.

FIG. 4 is a top plan view of the conventional film cartridge. As shown in FIG. 4, the cylindrical body is identified by 13. The film exit slit 14 defined in the split cylindrical body 13 extends axially over the length of the body 13 and is delimited by a mouthpiece 15 integral with the body 13. The mouthpiece portion 15 has light shielding cloth 16 for avoiding any possible entry of the external light into the cylindrical body 13 while permitting the passage of the film therethrough.

In a camera where the rewinding fork 8 is arranged at the top portion thereof as shown in FIG. 1, since the bottom cover 11 has the cut portion 11a as described above, the cut portion 11a tends to constitute an obstruction to the aesthetic design of the camera as a whole. Furthermore, in that camera, a linkage mechanism 6 for connecting the rewinding fork 8 to a driving motor 4 is required, therefore, the size of the camera becomes larger and the number of the component parts of the camera as a whole increases.

In order to overcome the above disadvantages, there has been proposed the camera shown in FIG. 3.

As is apparent from FIG. 3, since the rewinding fork 8 is arranged at the lower portion of the camera body, the linkage mechanism 5 is arranged only at the lower portion thereof, and therefore, the camera can be made compact, resulting in a reduction of the cost of the camera.

However, since the camera of FIG. 3 is a version of the camera for FIG. 1 wherein the rewinding fork 8 and the stopper 9 are moved from the upper portion of the camera to the lower portion thereof, the film cartridge can not be inserted into the film chamber 2 from the back side of the camera body in the direction orthogonal to the back surface thereof. Furthermore, in this case, the film cartridge is inserted thereinto from the rear of the camera body in an inclined direction to the back surface thereof, since a cut portion corresponding to the cut portion 11a of the bottom cover 11 can not be formed in the top cover. Although the bottom cover 11 of the bottom portion of the camera body is not noticeable when the camera is placed on a surface, the cut portion if formed in the top cover of the camera body would be noticeable when the camera is placed on a surface, and this would constitute an obstruction to the aesthetic design of the camera. In order to facilitate the loading of the film cartridge into the film chamber 2 easily, the film chamber has been increased in size by adding a space 2a to accommadate the film cartridge. However, a large space 2a makes the camera body bulky.

SUMMARY OF THE INVENTION

An essential object of the present invention is to provide a film cartridge support in a camera which permits an easy and quick insertion of the film cartridge into the film chamber with no resultant increase in camera body size.

Another object of the present invention is to provide a chamber of the camera for accommodating the film cartridge which can quickly receive therein the film cartridge being loaded.

According to one aspect of the present invention, there is provided a mechanism in a camera for supporting a film cartridge inside a film chamber for including a stopper means for limiting the rotation of said film cartridge around a shaft of said film cartridge. The stopper means is rotatably supported in a direction approximately orthogonal to a surface of a film set on said camera.

According to another aspect of the present invention, there is provided a chamber for accommodating a film cartridge in a camera, including a rewinding fork for rewinding the film. The rewinding fork being supported rotatably at a bottom portion of the camera body. Also provided is a cut portion formed at a top end portion of the camera body for allowing insertion of said film cartridge into said film chamber and for allowing removal of said film cartridge from said film chamber.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE PREFERRED EMBODIMENTS THE FIRST PREFERRED EMBODIMENT

A first preferred embodiment of the present invention will be described below with reference to FIGS. 5 to 9.

Figure 1:
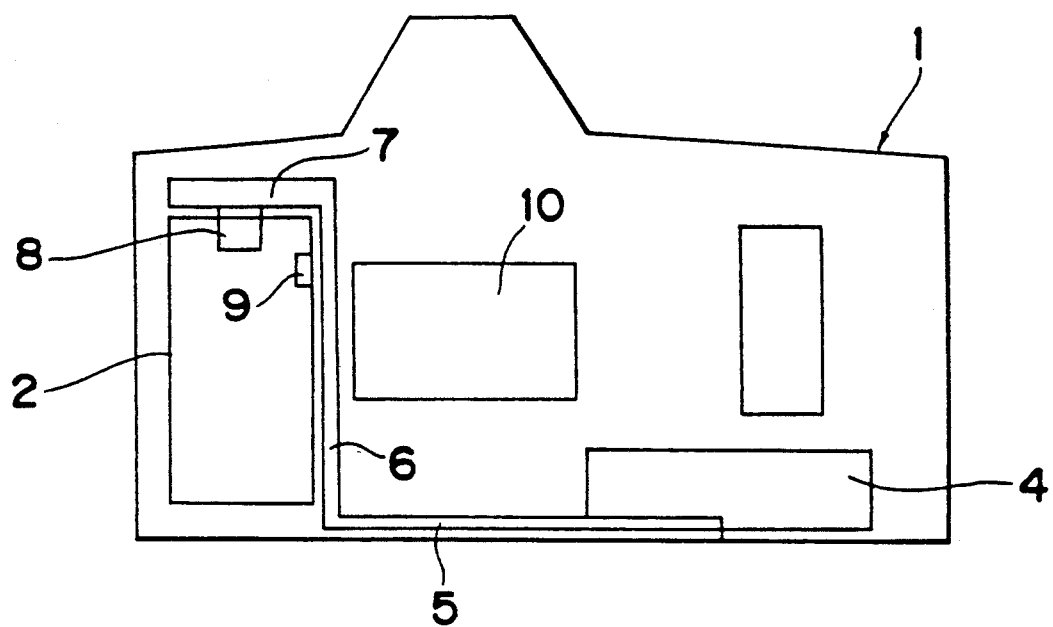
FIG. 1 is a schematic rear elevational view showing an internal construction of the conventional camera.
Figure 2:
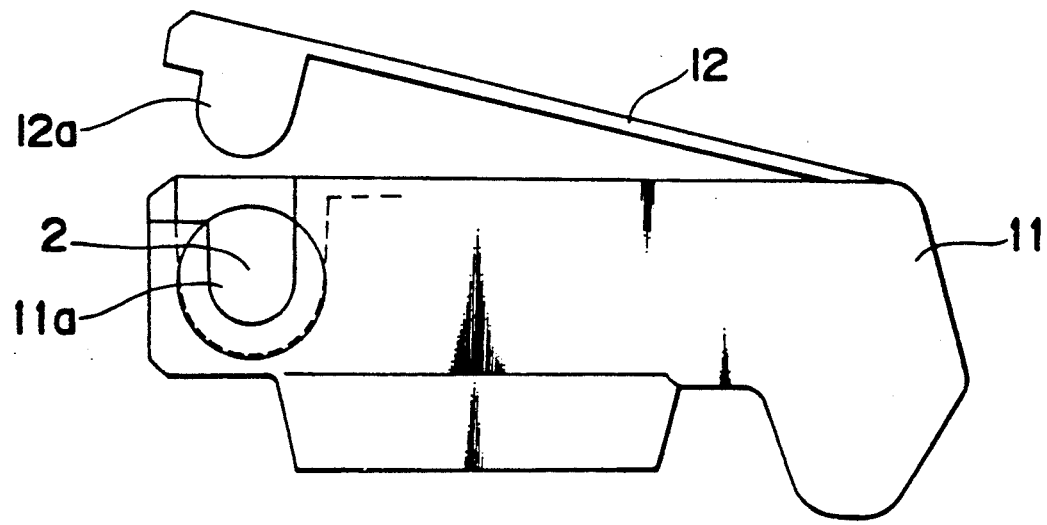
FIG. 2 is a schematic bottom plan view of another conventional camera.
Figure 3:
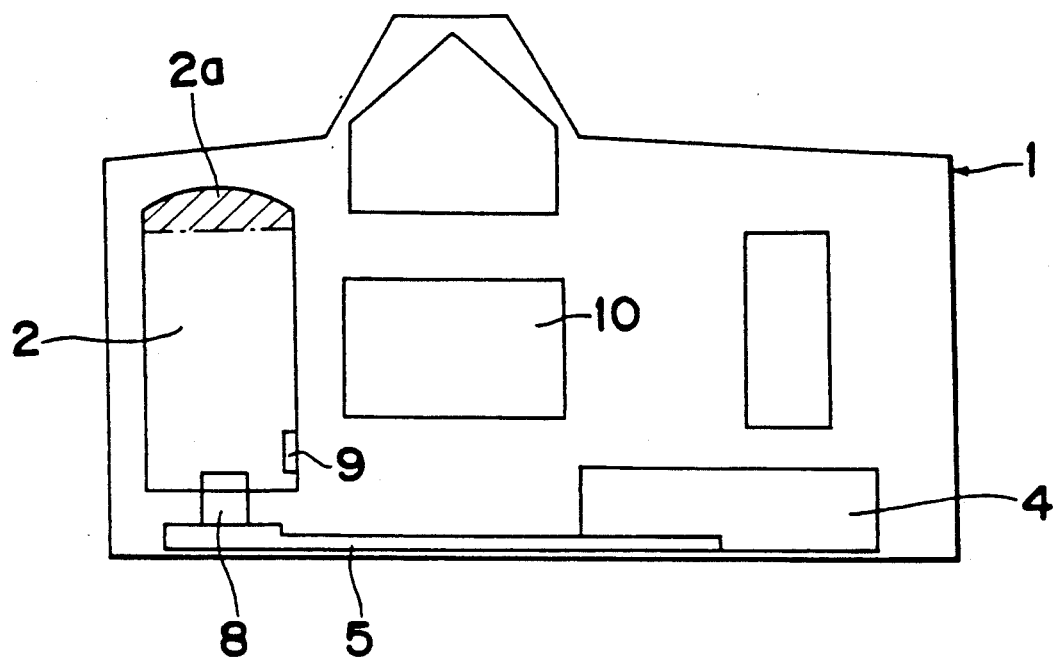
FIG. 3 is a schematic rear elevational view showing an internal construction of another conventional camera wherein the rewinding fork is arranged at the bottom portion thereof.
Figure 4:
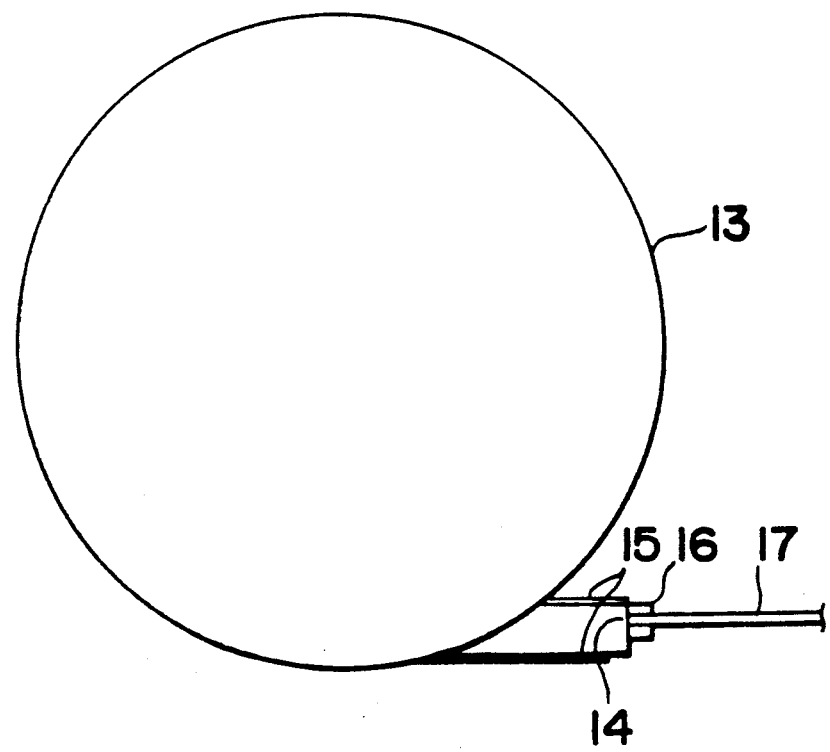
FIG. 4 is a schematic top plan view of the conventional film cartridge.
Figure 5:
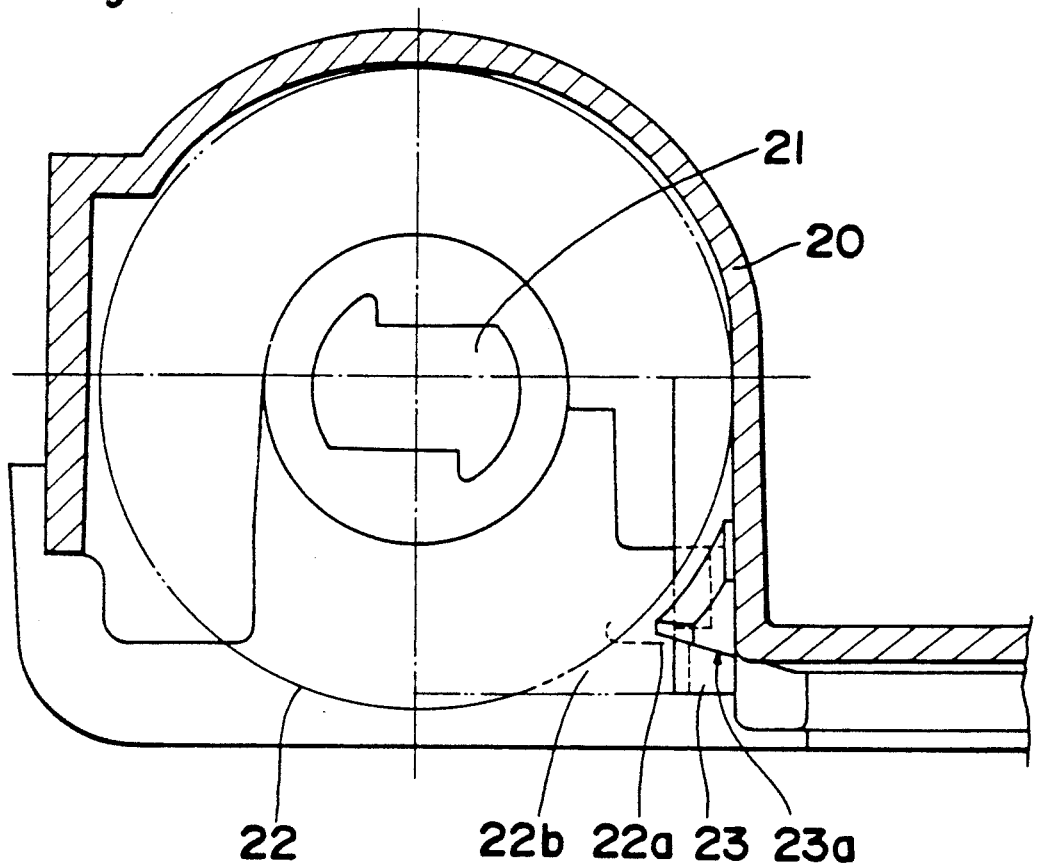
FIG. 5 is a schematic transverse sectional view of a film chamber in a camera according to a first preferred embodiment of the present invention.

As shown in FIG. 5, a mouthpiece portion 22a of a film cartridge 22 is in contact with an inclined surface 23a of a stopper 23 for limiting the rotation of the film cartridge 22, so that the rotation of the film cartridge 22 is regulated by the stopper 23.

Figure 8:
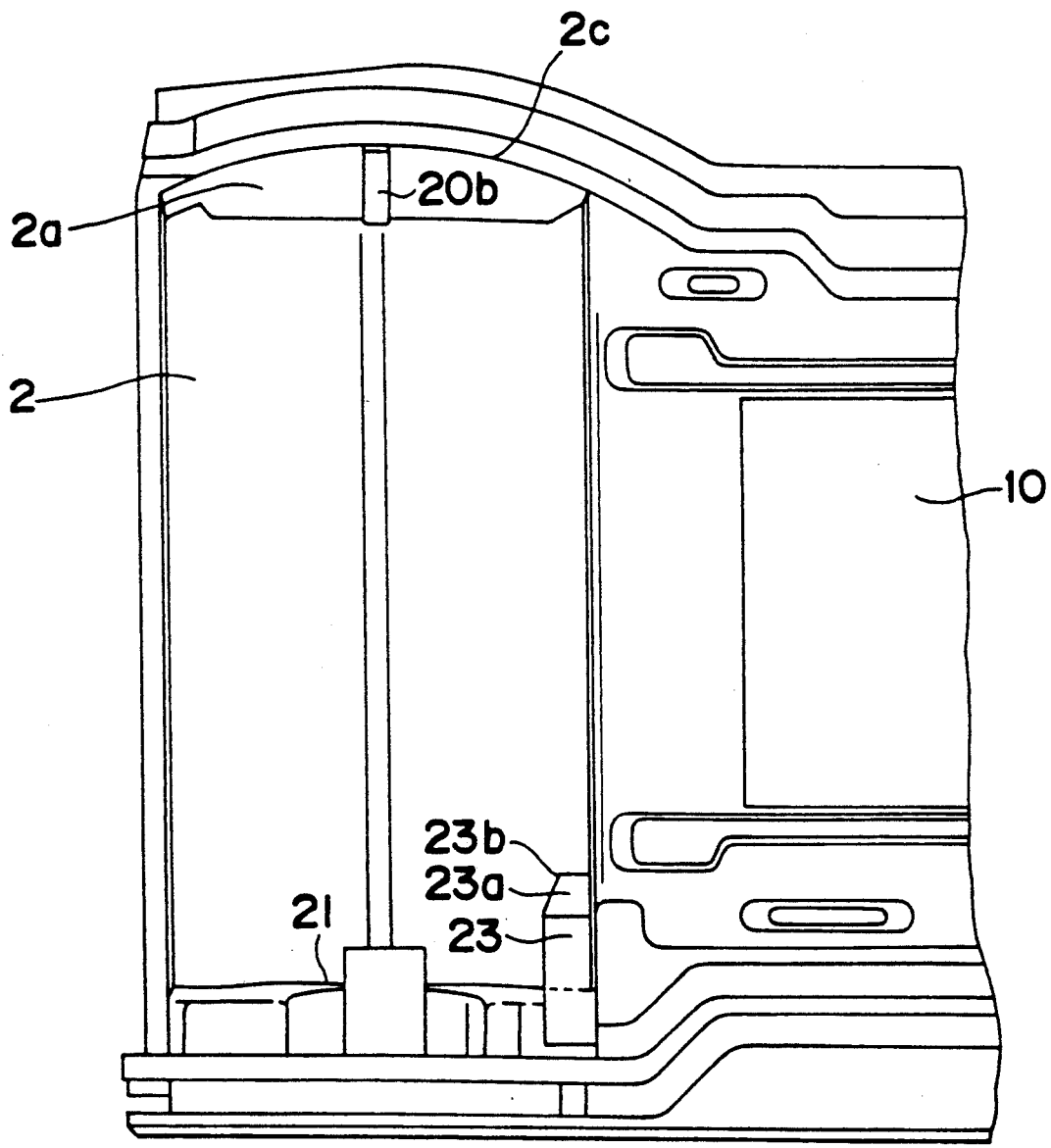
FIG. 8 is a schematic rear elevational view of the film chamber shown in FIG. 5.

As best shown in FIG. 8, a rewinding fork 21 is arranged at the lower portion of the camera body, and the stopper 23 is attached on an internal side surface of a lower portion of the film chamber 2. The stopper 23 comprises an inclined surface portion 23a for contacting with the mouthpiece portion 22a of the film cartridge 22, and a chamfered portion 23b shaped to facilitate an easy insertion of the film cartridge 22 into the film chamber 2. A top end portion 2c of the film chamber 2 is curved outwardly of the chamber to provide a generally arcuate ceiling below which a space 2a is defined for facilitating the insertion of the film cartridge 22 into the film chamber 2. In the center of the top portion of the film chamber 2, there is formed a guiding rail member 20b for guiding the film cartridge 22 when it is inserted into the film chamber 2. Since the film cartridge 22 is inserted into the film chamber 2 while guided by the guiding rail member 20b, the film cartridge 22 does not contact the inner surface 2c of the top end portion of the film chamber 2 when it is inserted thereinto, and marring of the inner surface 2c is therefore prevented.

Figure 6:
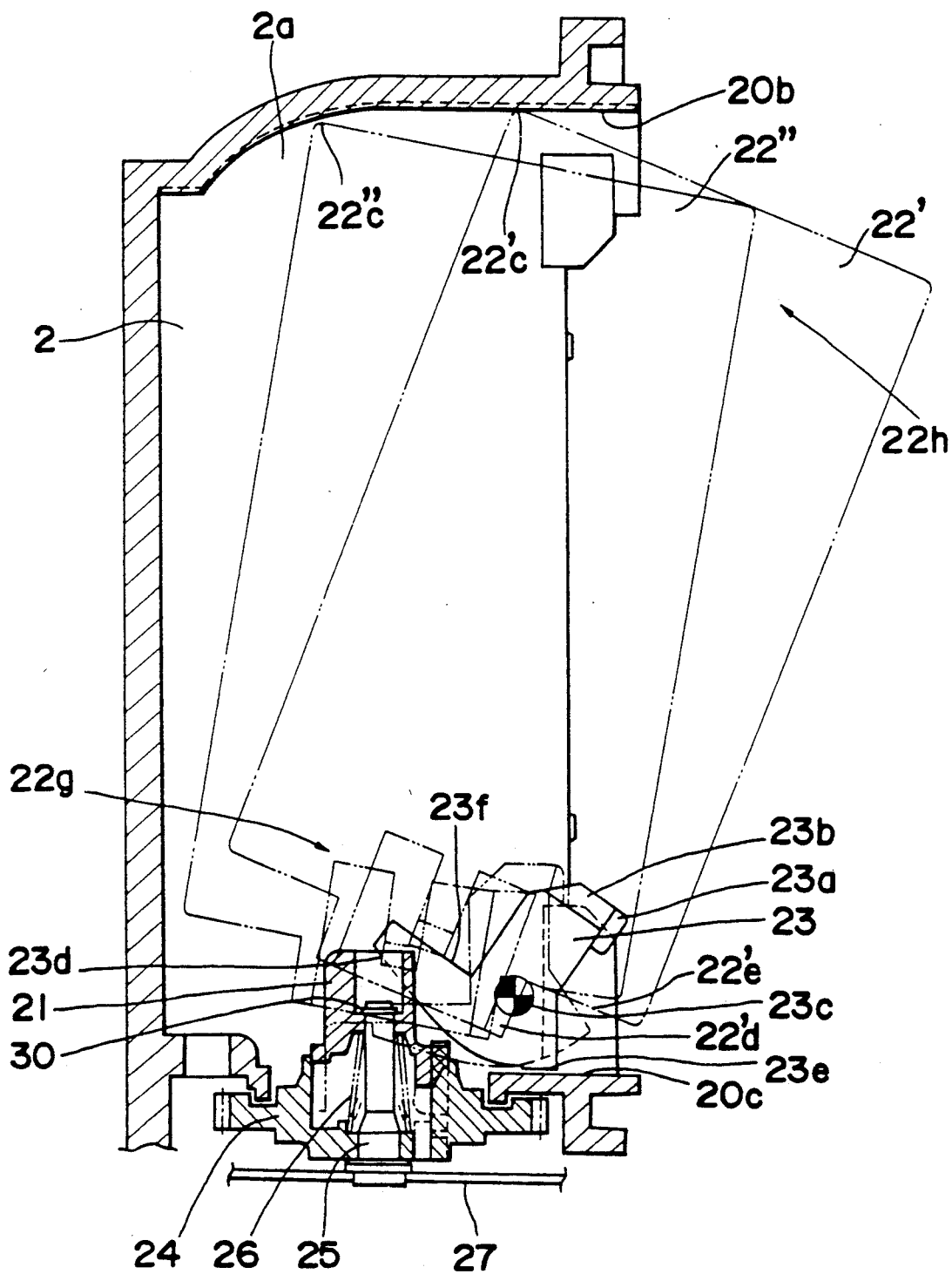
FIG. 6 is a schematic longitudinal sectional view of the film chamber shown in FIG. 5, showing a process by which a film cartridge is inserted into the film chamber.
Figure 7:
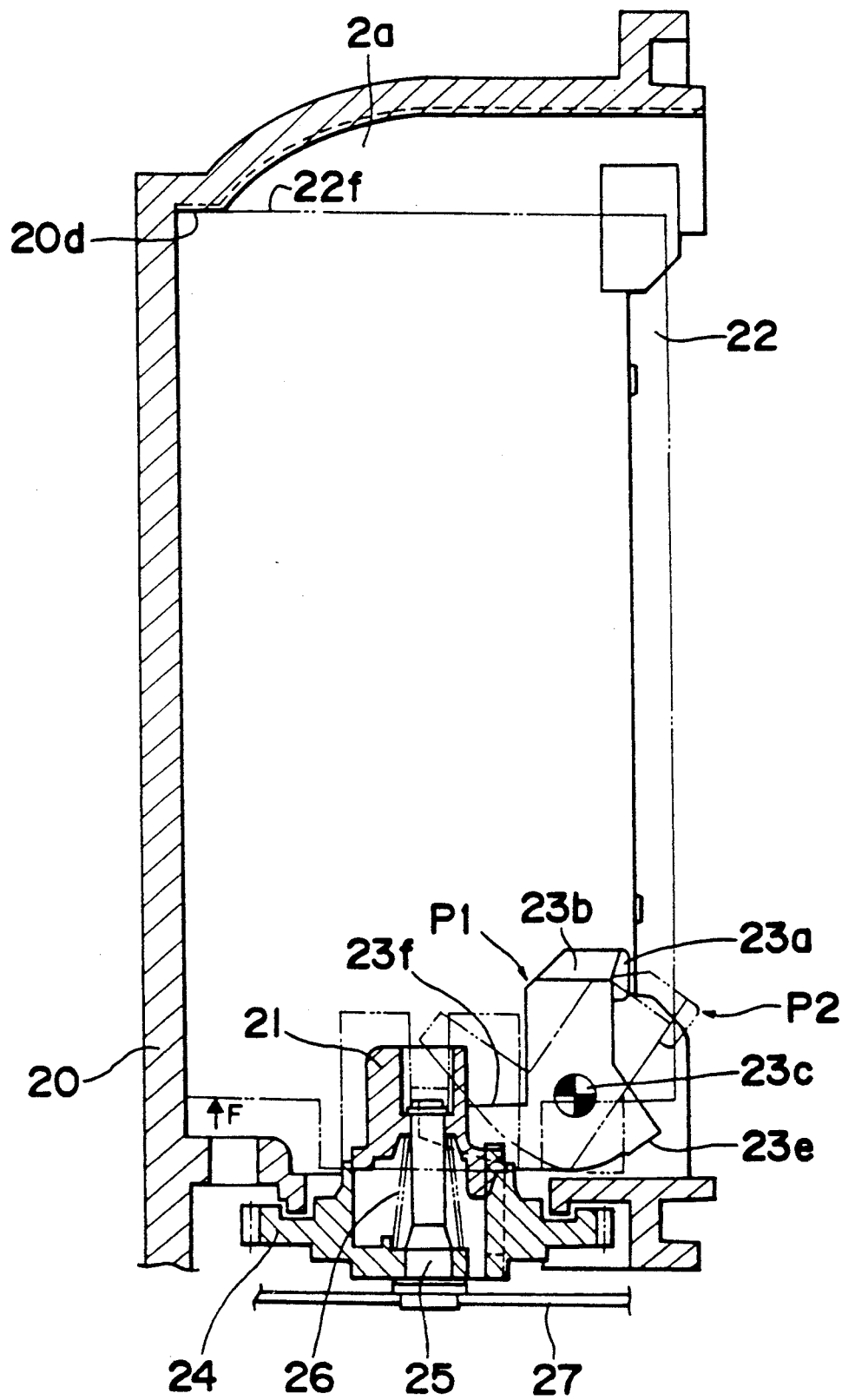
FIG. 7 is a schematic longitudinal cross sectional view of the film chamber shown in FIG. 5, after the film cartridge has been inserted into the film chamber completely.

FIG. 6 is a schematic longitudinal sectional view of the film chamber 2 showing a process in which the film cartridge 22 is inserted into the film chamber 2, and FIG. 7 is a schematic longitudinal sectional view of the film chamber 2 after the film cartridge 22 has been inserted into the film chamber 2 completely.

As indicated by numerals 22' and 22" in FIG. 6, the film cartridge 22 is inserted into the film chamber 2 by rotating the short hub side 22h around the end portion of the long hub side 22g as a fulcrum and moving the fulcrum to the left and downward in FIG. 6.

A rewinding fork 21 is drivingly connected with a rewinding gear 24 for rotation together therewith. A rewinding plate 27 is fixed to the camera body (not shown), and a shaft 25 is inserted into the rewinding plate 27 and is fixed thereto. The a rewinding gear 24 is inserted on and engaged with the shaft 25, and a coil spring 26 is inserted around the shaft 25. Then, the rewinding fork 21 is inserted onto the shaft 25, and an E ring 30 for preventing the rewinding fork 21 from coming off the shaft 25 is put on the top portion of the shaft 25. The rewinding gear 24 is connected with a driving motor (not shown) through gears (not shown). Therefore, when the rewinding fork 21 is rotated through the rewinding gear 24 by the driving motor, the film within the film cartridge 22 is rewound by the rewinding fork 21. The rewinding fork 21 is retractable downwardly, but is normally biased upwardly by a coil spring 26.

As shown in FIG. 7, the stopper 23 is supported rotatably by the shaft 23c so as to rotate (in a plate generally orthogonal to the film cartridge) between an accommodating position P1, when the film cartridge 22 has been inserted into the film chamber 2, and a projected position P2 when the film cartridge 22 has been pulled out from the camera body.

When the film cartridge 22 is inserted into the film chamber 2, the stopper 23 is rotated about the shaft 23c to the projected position P2. Then, when the film cartridge 22 is pushed and inserted into the film chamber 2 in a manner indicated by the numerals 22' and 22" of FIG. 6, an end surface 22'e of the film cartridge 22 pushes the a projected portion 23f of the stopper 23 so that the stopper 23 is rotated counterclockwise as viewed in FIG. 6. Furthermore, as shown in FIG. 6, when the film cartridge 22 is inserted into the film chamber 2, the rewinding fork 21 is pushed down by the end portion 22'd of the long hub side 22g with the fork 21 consequently retracted. Also, end portions 22'c and 22"c of the short hub side 22h of the film cartridge 22 are moved along the guiding rail member 20b.

FIG. 7 shows the state in which the film cartridge 22 has been inserted into the film chamber 2 completely.

When the film cartridge 22 has been inserted into the film chamber 2 completely, an upwardly acting biasing force F is applied to the film cartridge 22 by a push-up spring (not shown) which is fixed on the camera body. At the top portion of the film chamber 2, there is formed a contacting surface 20d to which an end surface 22f of the short hub side of the film cartridge 22 is engaged to retain the film cartridge 22 generally longitudinally aligned in the film chamber 2. The contacting surface 20d prevents the film cartridge 22 from moving toward the back side of the camera. When the film cartridge 22 is inserted into the film chamber 2 and the film is ready to be wound, the stopper 23 is set at the accommodating position P1 as shown in FIG. 7.

Figure 9:
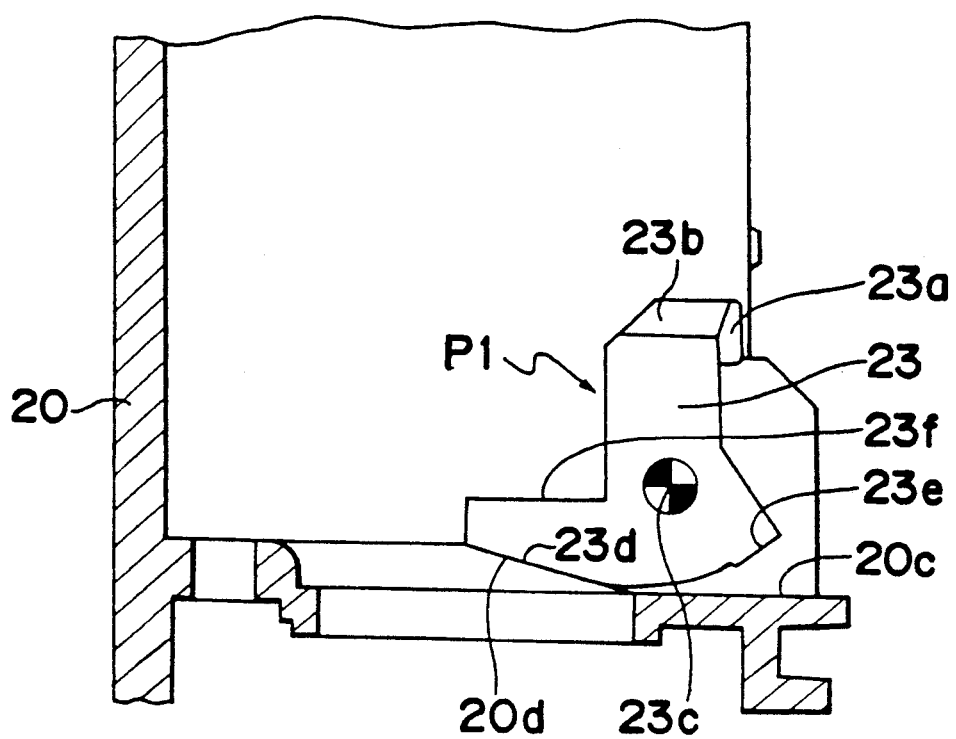
FIG. 9 is a schematic longitudinal cross sectional view of the lower portion of the film chamber shown in FIG. 5.

In FIG. 8, the stopper 23 rotates about an axis parallel to the sheet surface on exposure window 10 of FIG. 8. FIG. 9 is a schematic longitudinal sectional view of the lower portion of the film chamber 2, with the film cartridge 22 and the rewinding mechanism such as the rewinding fork 21, the rewinding gear etc. removed for the sake of clarity.

FIG. 9 shows a state in which the stopper 23 is set at the accommodating position P1. In this case, an inclined surface portion 23d of the stopper 23 is in contact with an inclined surface portion 20d of the bottom portion of the camera body 20 so that the counterclockwise rotation of the stopper 23 is limited. Furthermore, when the stopper 23 is rotated in the counterclockwise direction so as to occupy the projected position P2, a portion 23e of the stopper 23 is brought into contact with a bottom surface 20c of the camera body so that the clockwise rotation of the stopper 23 is limited.

Furthermore, as shown in FIG. 5, even though a rewinding force acting in the counterclockwise direction is applied to the film cartridge 22 after the film has been wound to the last available frame, the film cartridge 22 can not be rotated beyond the position thereof shown in FIG. 5. Therefore, the stopper 23 will not be rotated unnecessarily, regardless of whether it is touched on purpose or by mistake.

In the aforementioned embodiment, the stopper 23 is supported for pivotal motion between the positions P1 and P2. However, the stopper 23 may be biased toward the projected position P2 by a coil spring. If the stopper 23 is biased toward the projected position P2, the film cartridge 22 can be inserted into the film chamber 2 easily. Alternatively, the stopper 23 may be biased toward the accommodating position P1 by a coil spring. In such a case, when the film cartridge 22 is inserted into the film chamber 2, the top end portion 23a of the stopper 23 does not contact the light shielding cloth 16 of the film cartridge 22, and also the film cartridge 22 can be held more stably when the film cartridge has been inserted into the film chamber 2 completely.

As described above, the stopper 23 limiting the rotation of the film cartridge 22 is supported rotatably so that the film cartridge 22 can be inserted into the film chamber 2 easily. Therefore, it is not necessary to enlarge unnecessarily the space 2a for accommodating the film cartridge 22, and the camera need not be increased in size. Furthermore, the above construction makes it easier to pull the film cartridge 22 from the film chamber 2. Additionally, the mechanism for supporting the film cartridge 22 according to the present invention is applicable to the type of camera wherein the rewinding fork 21 is placed in the upper portion of the film chamber 2.

THE SECOND PREFERRED EMBODIMENT

A second preferred embodiment according to the present invention will be described below with reference to FIGS. 10 to 14.

Figure 10:
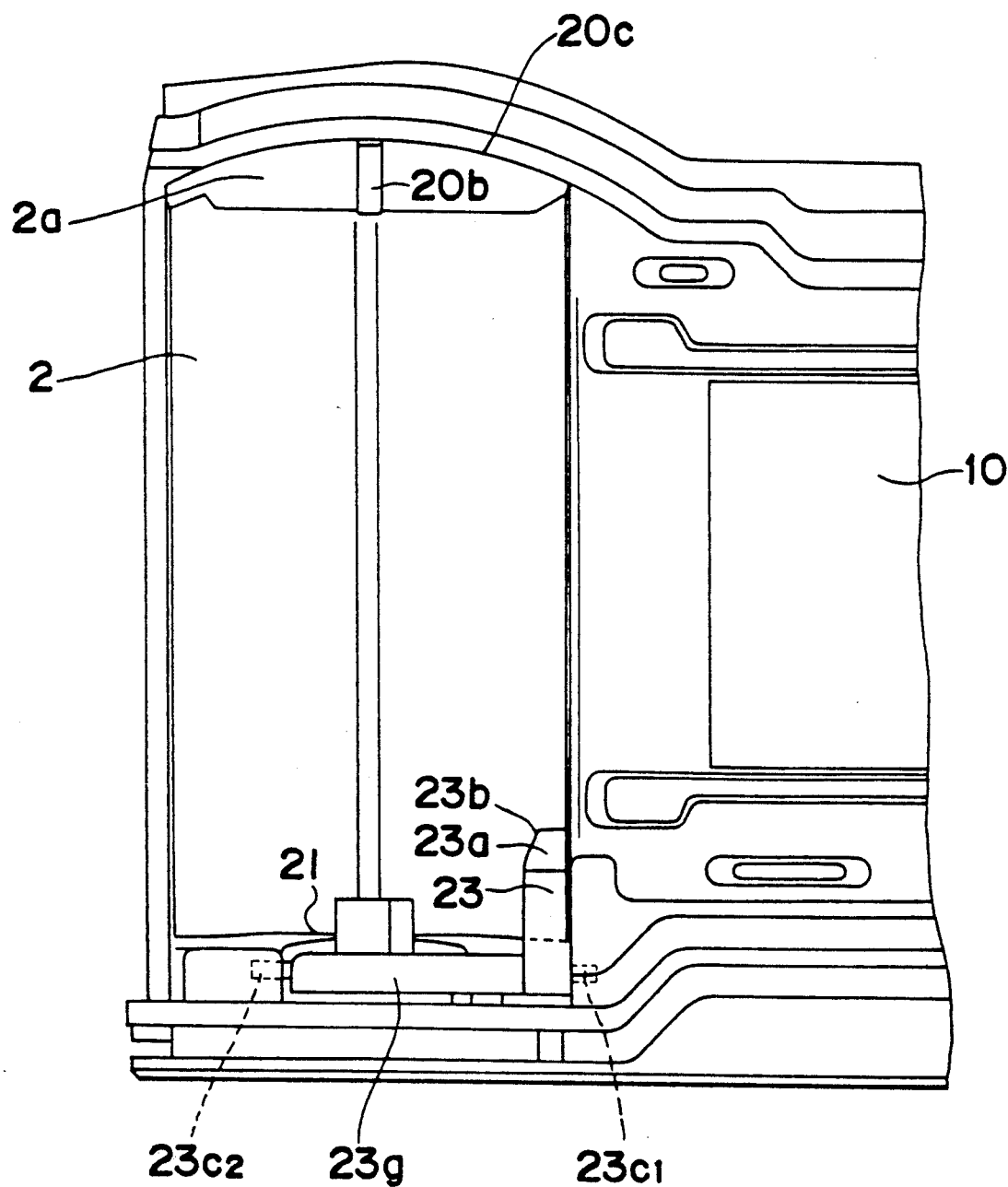
FIG. 10 is a schematic back view of a film chamber of the camera according to the second preferred embodiment of the present invention, as seen from the rear of the camera.
Figure 11:
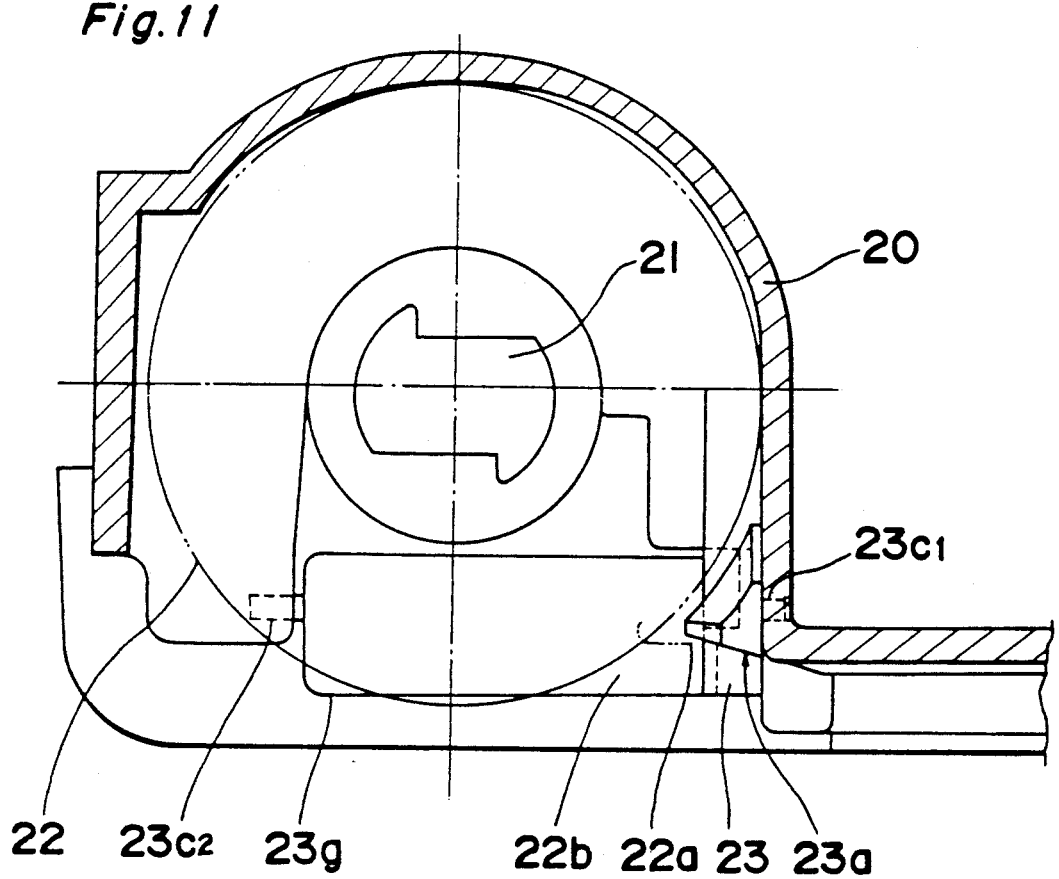
FIG. 11 is a schematic transverse sectional view of the film chamber shown in FIG. 10.

FIG. 10 is a schematic rear elevational view of the film chamber 2 according to the second preferred embodiment of the present invention, as seen from the rear of the camera body, and FIG. 11 is a schematic transverse sectional view of the film chamber 2 thereof.

In the second preferred embodiment, the stopper 23 is placed at a position on the back cover side of the rewinding fork 21, and is formed as a unitary body together with a block portion 23g arranged so as to extend across the lower portion of the film chamber 2 in a direction orthogonal to the longitudinal direction of the film chamber 2. Furthermore, the shaft 23c further including a shaft 23c1 and a shaft 23c2 at both ends thereof has a length greater than that used in the first preferred embodiment.

Figure 12:
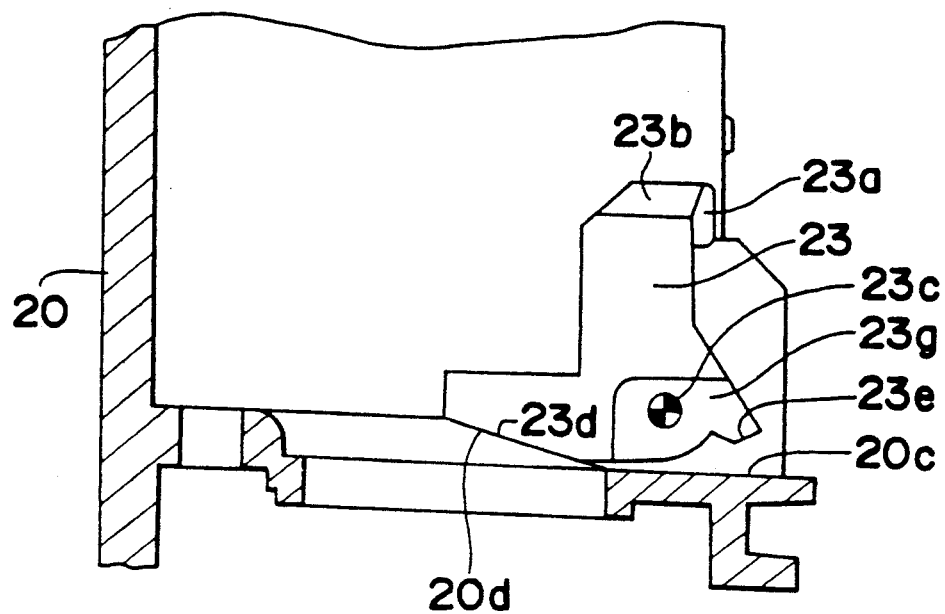
FIG. 12 is a schematic longitudinal sectional view of the lower portion of the film chamber shown in FIG. 10.

FIG. 12 is a schematic transverse sectional view of the lower portion of the film chamber 2, which is similar to FIG. 9 of the first preferred embodiment. As shown in FIG. 12, the block portion 23g is supported for rotation around the shaft 23c with the stopper 23.

Figure 13:
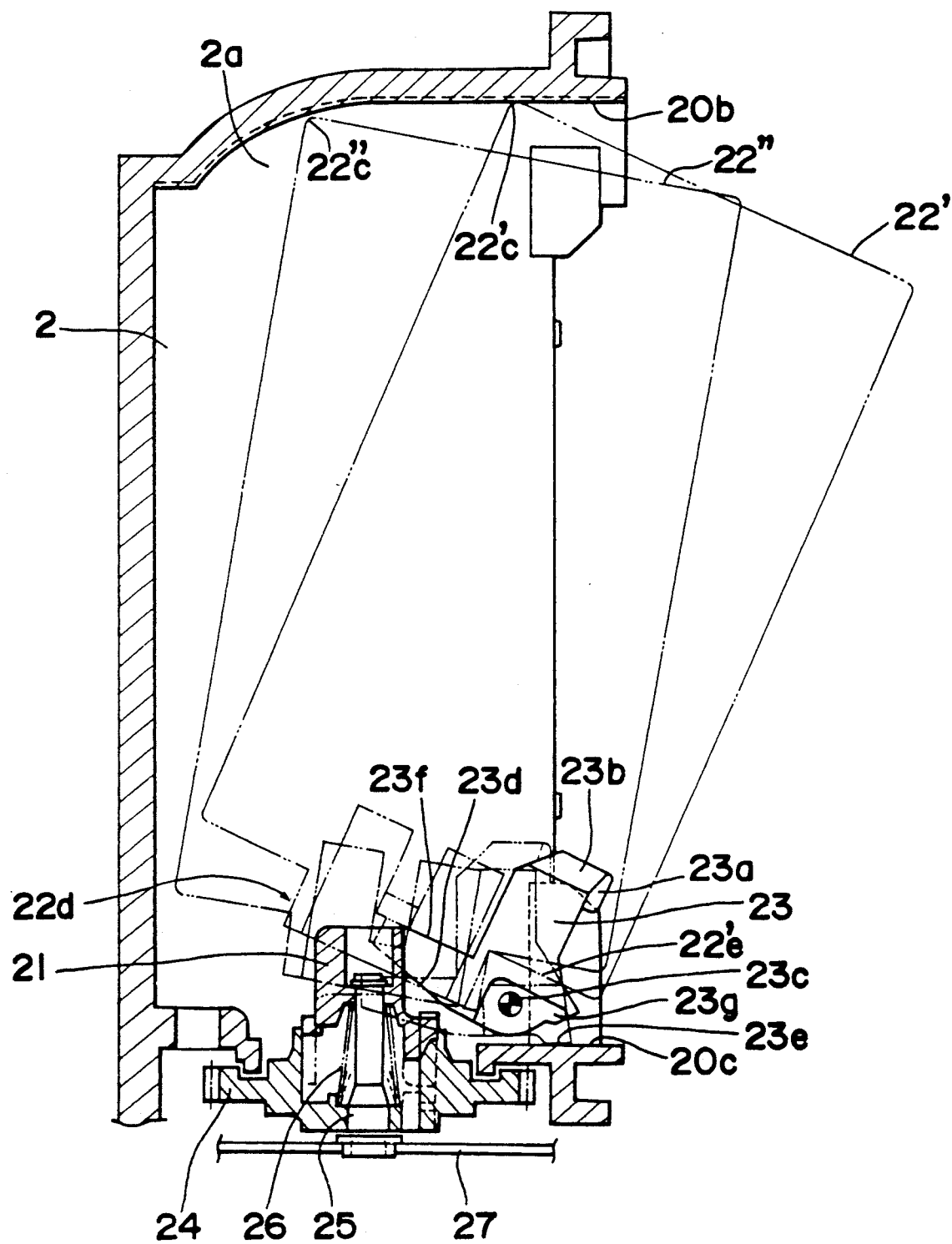
FIG. 13 is a schematic longitudinal sectional view of the film chamber shown in FIG. 10, showing a process by which a film cartridge is inserted into the film chamber.

FIG. 13 shows a process in which the film cartridge 22 is inserted into the film chamber 2.

In the rewinding system according to the present invention wherein a film spool on the side of the long hub 22d of the film cartridge 22 is used, if the rewinding fork 21 is always biased upward, i.e., toward the projected direction, the operator has to set the long hub 22d of the film cartridge 22 on the projected rewinding fork 21 in a way to cover the rewinding fork 21 when the film cartridge 22 is inserted into the film chamber 2.

Referring back to FIG. 8 of the first preferred embodiment, since no appropriate guiding means for guiding the film cartridge into the film chamber 2 is provided in front of the rewinding fork 21, the film cartridge 22 may not be inserted into the film chamber 2 properly. For example, the long hub 22d of the film cartridge 22 may be put in front of the rewinding fork 21. Furthermore, when the operator tries to insert the film cartridge 22 into the film chamber 2 by moving the film cartridge 22 approximately orthogonally to the back surface of the camera body, the long hub 22d of the film cartridge 22 will be in contact with the side portion of the rewinding fork 21. When the film cartridge 22 is further pushed, the rewinding mechanism (i.e., the rewinding fork 21, etc.) may be broken.

In order to solve the above problem, in the second preferred embodiment, the block portion 23g of the stopper 23 is arranged on the back cover side of the rewinding fork 21 as shown in FIG. 13. This arrangement indicates to an operator that the long hub 22d of the film cartridge 22 is to be inserted behind the block portion 23g, and the arrangement can thereby prevent the aforementioned misoperation. Furthermore, when the operator tries to insert the film cartridge 22 into the film chamber 2 by moving it approximately orthogonal to the back surface of the camera body, the long hub 22d of the film cartridge will contact the block portion 23g of the stopper 23, and this makes the operator realize his wrong inserting the film cartridge 22 into the film chamber 2. Therefore, incorrect insertion of the film cartridge 22 can be prevented, and the rewinding mechanism can be prevented from being broken.

Next, the method by which the operator pulls the film cartridge 22 out of the film chamber 2 will be described.

Referring back to the first preferred embodiment as shown in FIG. 7. the film cartridge 22 has been inserted into the film chamber 2, and usually the film cartridge 22 is pulled from the film chamber 2 by the operator hooking his finger on the end portion 22f of the short hub side of the film cartridge 22. Then, the operator can look at not only the upper space 2a of the film chamber 2 but also at the space on the side of the long hub 22d of the film cartridge 22 and at the long hub 22d of the film cartridge 22. However, before he does this, the operator can not see whether the rewinding fork 21 is positioned at the upper or the lower portions of the film chamber 2, since the rewinding fork 21 will usually be retracted. If the operator tries to pull the film cartridge 22 from the film chamber 2 by hooking his finger on the end portion of the long hub side 22d of the film cartridge 22, the film cartridge 22 can not be pulled out since the rewinding fork 21 is engaged within the long hub 22d of the film cartridge 22. If the operator tries to pull the film cartridge 22 from the film chamber 2 forcibly, the rewinding mechanism may be broken.

Figure 14:
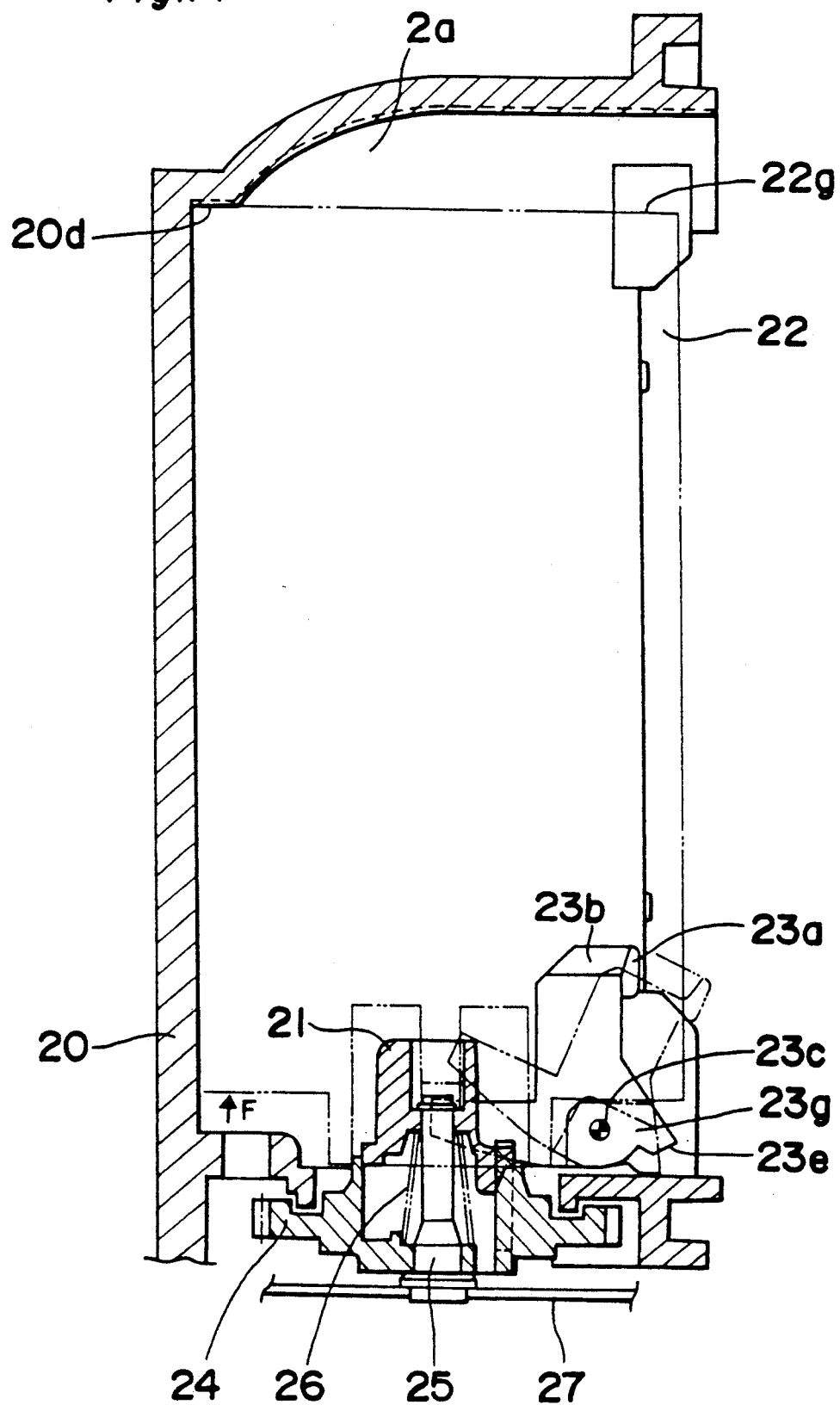
FIG. 14 is a schematic longitudinal sectional view of the film chamber shown in FIG. 10, in after the film cartridge has been inserted into the film chamber completely.

In the second preferred embodiment, since the block portion 23g occupies the lower portion of the film chamber 2 as shown in FIG. 14, the operator need look at only the upper space 2a and can then pull the film cartridge 22 properly from the film chamber 2 by hooking his finger on the end portion 22g of the short hub of the film cartridge 22. Since his finger cannot enter into the lower space of the film chamber 2, the operator will not pull on the end portion of the long hub side of the film cartridge 22 on purpose or by mistake. Therefore, the operator will not pull the film cartridge 22 from the film chamber 2 in the wrong direction, and the rewinding mechanism i.e., the rewinding fork 21, etc. can be prevented from being broken.

Furthermore, as shown in FIGS. 10 and 11, the shafts 23c1 and 23c2 are arranged on both ends of the block portion 23g of the stopper 23. Therefore, the shaft 23c including the shaft 23c1 and 23c2 has a length greater than that of the shaft 23c used in the first preferred embodiment, not only so that the unsteadiness of the stopper 23 can be lessened, but also so that the stopper 23 can be thickened in the vicinity of both end portions of the shaft 23c. Therefore, the rigidity of the shaft 23c supporting the stopper 23 is increased against the load on the shaft 23c when the mouthpiece portion 15a of the film cartridge 22 is in contact with the stopper 23.

Figure 10A:
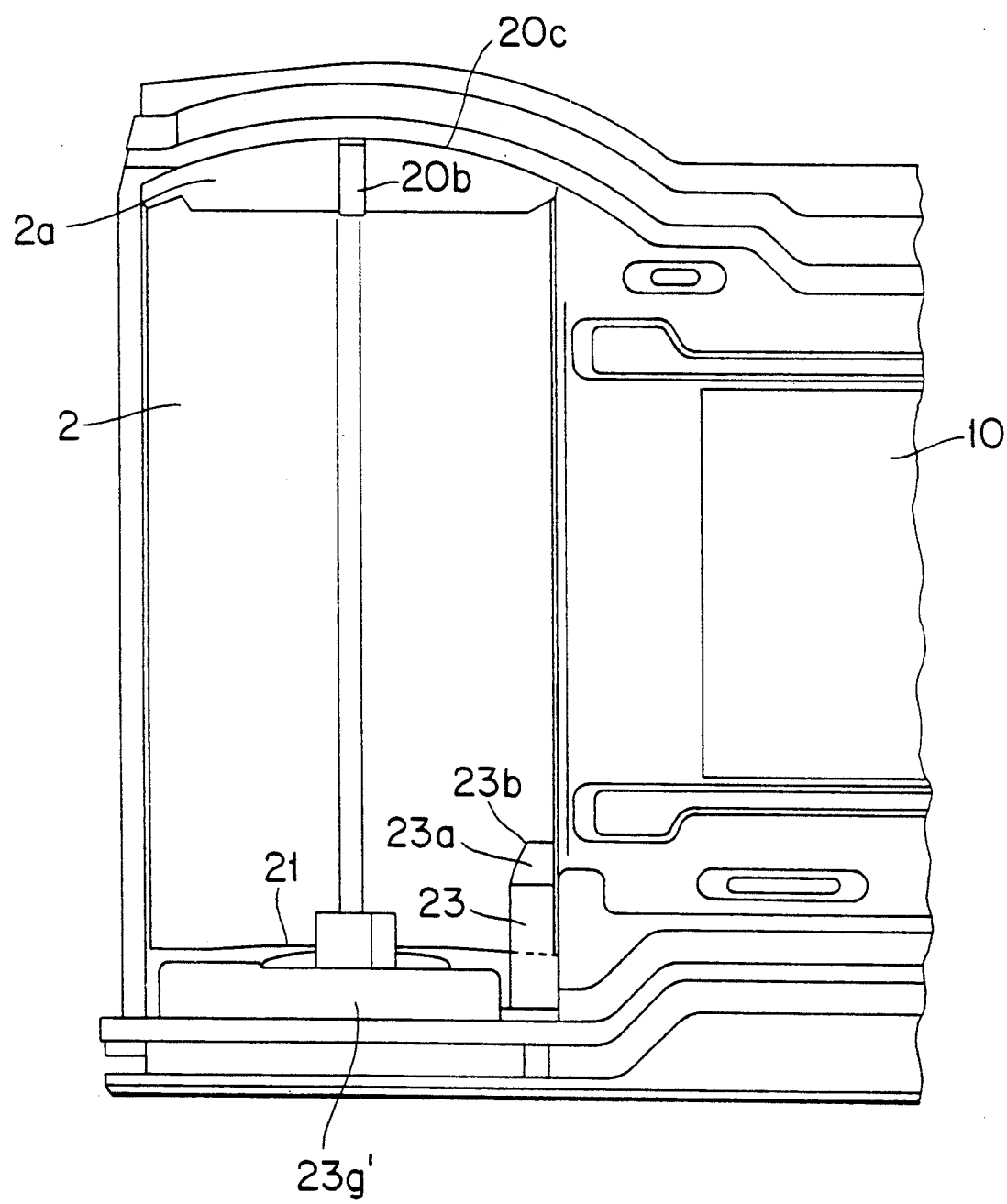
FIG. 10a is a schematic back view of a film chamber of the camera according to a modification of the second preferred embodiment of the present invention, as seen from the rear of the camera.

FIG. 10a shows a modification of the second embodiment, wherein a block portion 23g, is separated from the main body of the stopper 23, and the block portion 23g, is fixed at a position on the back cover side of the rewinding fork 21 in the lower portion of the film chamber 2. The block portion 23g, may be formed as a unitary body together with the camera body 20. This modification of the second embodiment would also prevent the film cartridge 22 from being inserted or pulled out in a wrong direction.

THE THIRD PREFERRED EMBODIMENT

A third preferred embodiment according to the present invention will described below with reference to FIGS. 15 to 17.

Figure 15:
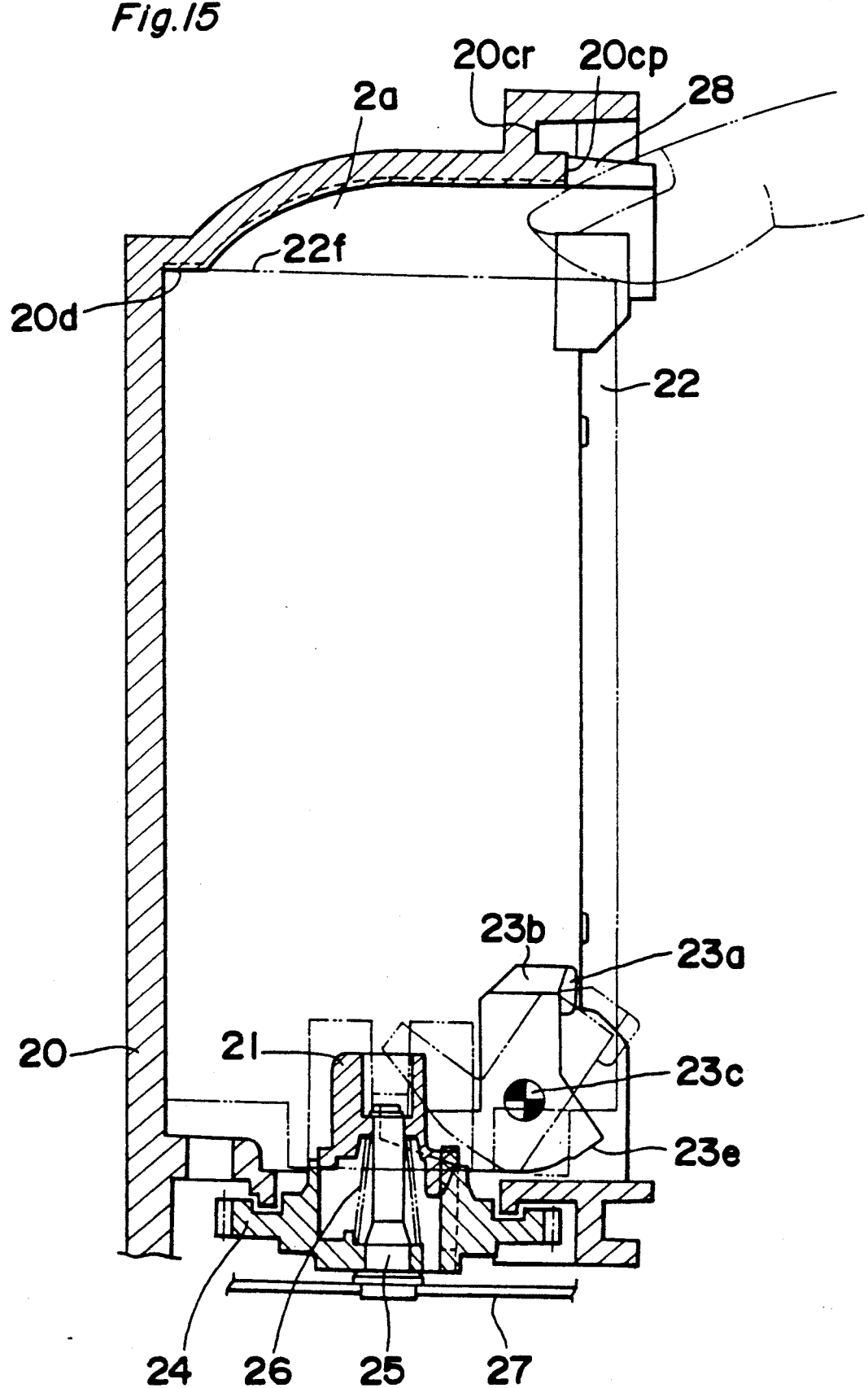
FIG. 15 is a schematic longitudinal sectional view of a film chamber in the camera according to a third preferred embodiment of the present invention, showing the film cartridge inserted in the film chamber.
Figure 16:
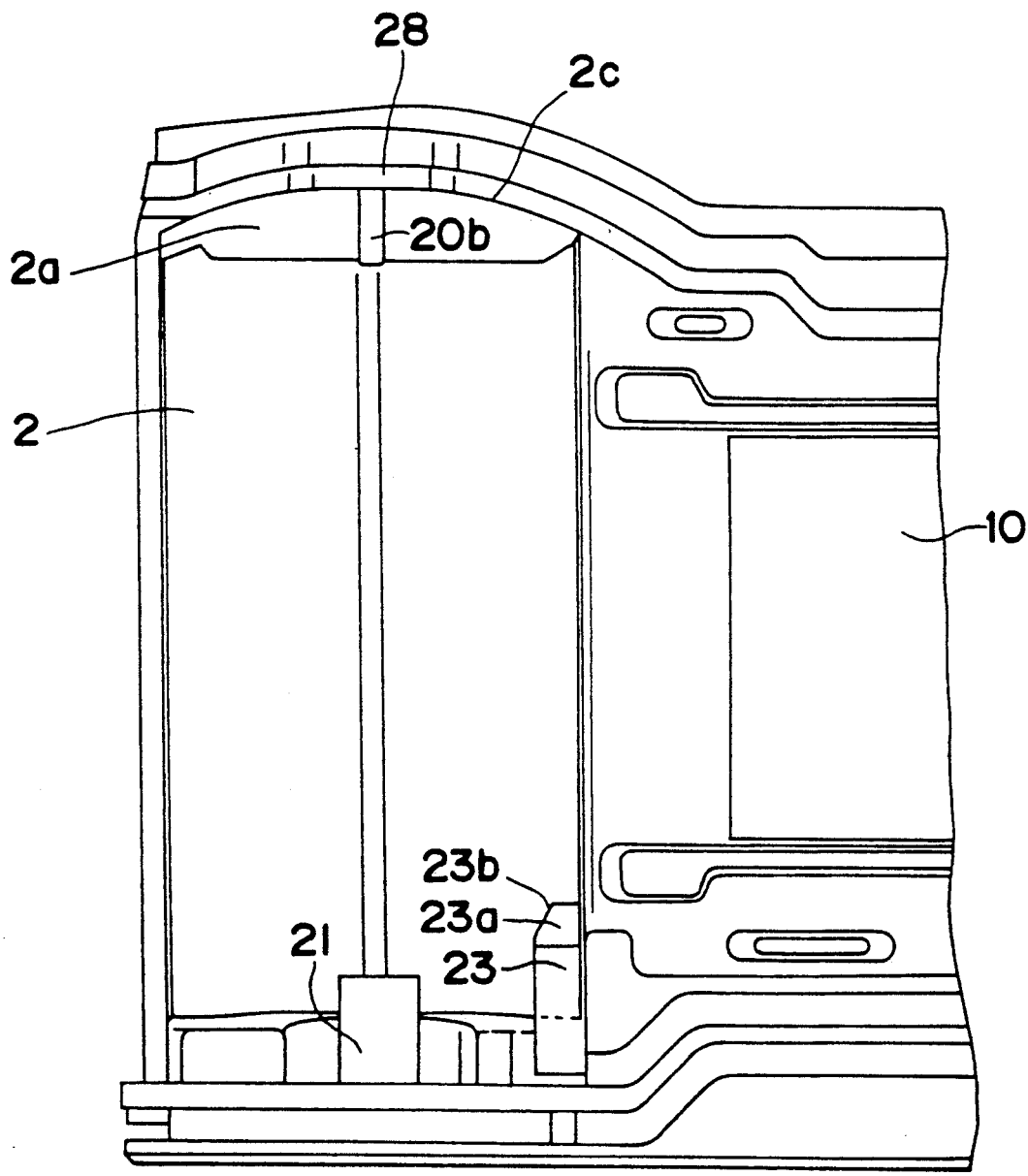
FIG. 16 is a schematic rear elevational view of the film chamber shown in FIG. 15, as seen from rear of the camera.
Figure 17:
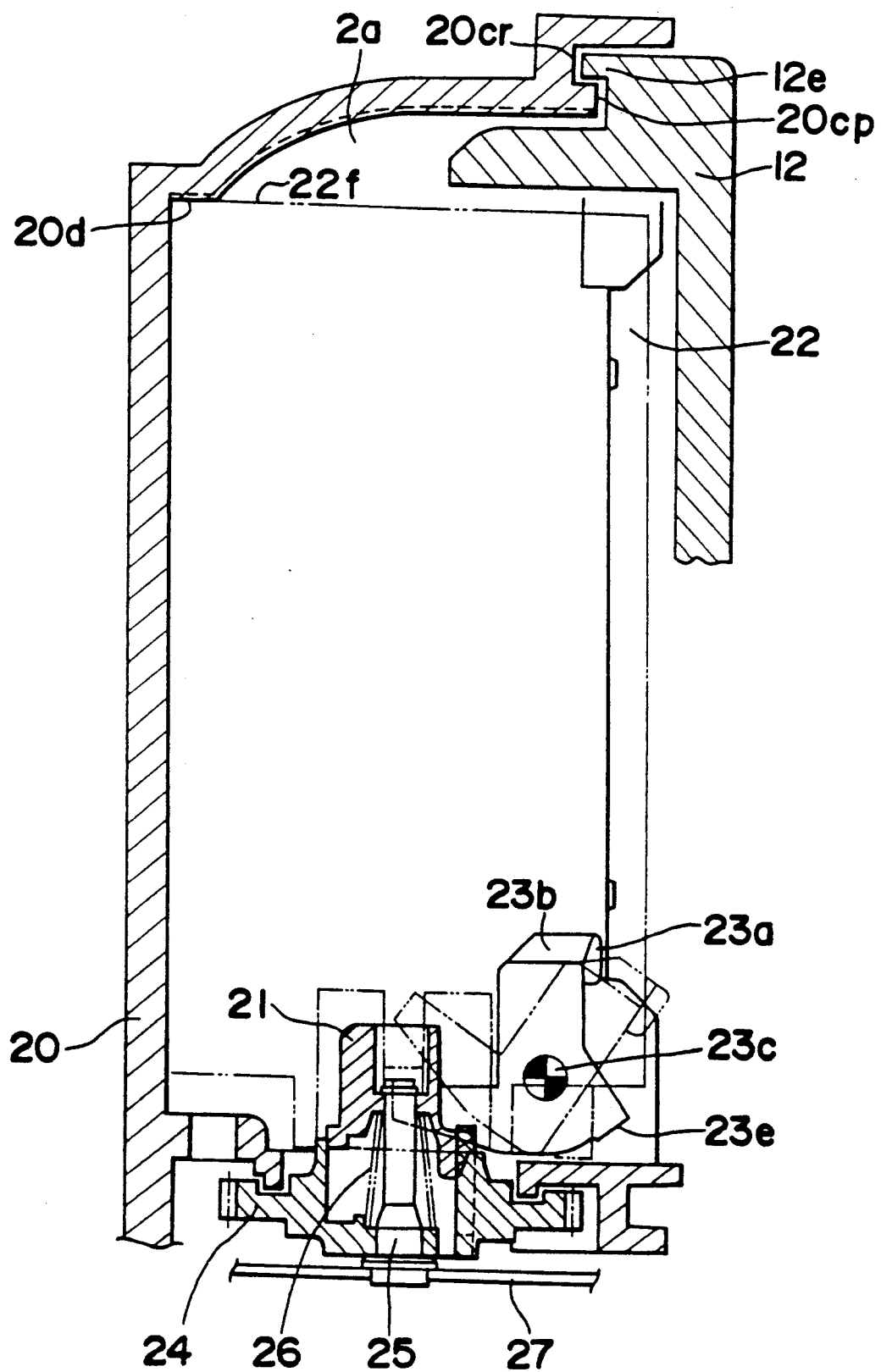
FIG. 17 is a schematic longitudinal sectional view of the film chamber shown in FIG. 15 including a means for shielding a light incident to the camera.

FIG. 15 is a schematic longitudinal sectional view of the film chamber according to the third preferred embodiment, after the film cartridge 22 has been inserted into the film chamber 2 and FIG. 16 is a schematic rear elevational view of the film chamber thereof as viewed from rear of the camera.

Generally, a space 2a in the upper portion of the film chamber 2 is provided so that the film cartridge 22 can be inserted into the film chamber 2, and it is necessary to make enough space 2a for the operator's finger to enter in order to insert and pull out the film cartridge 22 easily. In order to satisfy the above requirements, the size of the film chamber 2 must be increased, and the camera thereby becomes bulky.

In the third preferred embodiment, in order to minimize the space required to insert the film cartridge 22 into the film chamber 2, as shown in FIGS. 15 and 16. a cut portion 20cr having a space 28 to accommodate the operator's finger is formed at the upper portion of the film chamber 2. As a result, the film cartridge 22 can be inserted into the film chamber 2 or pulled out therefrom easily, and the size of the camera is not unnecessarily bulky.

In this case, since there is formed a cut portion 20cp at the top portion of the camera body 20 as shown in FIG. 15, it is necessary to provide a means for shielding a light which could otherwise enter the camera through the cut portion 20cp. FIG. 17 shows the use of such light shielding means. As shown in FIG. 17, the cut portion 20cp and a recess portion 20cr are formed at the top portion of the camera body 20, and an engaging portion 12e is formed at the top portion of the back cover 12. When the back cover 12 is closed, the engaging portion 12e of the back cover 12 engages around the cut portion 20cp in the recess portion 20cr of the camera body 20, so that light is prevented from entering the camera.

It is understood that various other modifications will be apparent to and can be readily made by those skilled in the art without departing from the scope and spirit of the present invention. Accordingly, it is not intended that the scope of the claims appended hereto be limited to the description as set forth herein and the illustrated embodiments, but rather that the claims be construed as encompassing all the features of patentable novelty that reside in the present invention, including all features that would be treated as equivalents thereof by those skilled in the art to which the present invention pertains.

What is claimed is:

1. A mechanism for supporting a film cartridge inside of a film chamber of a camera body which has a rewinding member for rewinding a film of the film cartridge, said rewinding member remaining unretracted into said camera body prior to reception of the film cartridge into said film chamber, said mechanism comprising:
   stopper means for regulating rotation of the film cartridge around a shaft of the film cartridge;
   a block member arranged at a position between said rewinding member and a back cover side of said film chamber extending across said film chamber, said block member preventing said film cartridge from being inserted into said film chamber along a direction perpendicular to the shaft of the film cartridge, thereby allowing the film cartridge to be obliquely inserted into the film chamber so that an end portion of the film cartridge overreaches said block member and leading said film cartridge so that said shaft of the film cartridge is fitted into said rewinding member; and
   a space of said film chamber for facilitating the insertion of said film cartridge into said film chamber over said block member, said space being formed in an end portion of said film chamber positioned on a side thereof opposite said rewinding member.

2. A mechanism as claimed in claim 1, wherein said block member is formed as one body with said camera body.

3. A mechanism as claimed in claim 1, wherein said block member is formed as one body with said stopper means.

4. A mechanism as claimed in claim 1, wherein said end portion of said film chamber is curved outwardly so as to provide said space.

5. A mechanism as claimed in claim 1, wherein said stopper means is rotatably supported between a first position and a second position.

6. A mechanism as claimed in claim 5, wherein said first position of said stopper means is a projected position for allowing the film cartridge to be inserted into said film chamber.

7. A mechanism as claimed in claim 5, wherein said second position is an accommodating position for accommodating the film cartridge when the film cartridge has been inserted into said film chamber and for regulating the rotation of the film cartridge around the shaft of the film cartridge within said film chamber.

8. A mechanism as claimed in claim 6, further including biasing means for biasing said stopper means toward said projected position.

9. A mechanism as claimed in claim 7, further including biasing means for biasing said stopper means toward said accommodating position.

10. A mechanism as claimed in claim 1, wherein said stopper means is arranged on a side of said film chamber close to an exposing aperture formed in said camera body.

11. A mechanism for supporting a film cartridge inside of a film chamber of a camera body which has a rewinding member for rewinding a film of the film cartridge, said rewinding member remaining unretracted into said camera body prior to reception of the film cartridge into said film chamber, said mechanism comprising:
   a block member arranged at a position between said rewinding member and a back cover side of said film chamber extending across said film chamber, said block member preventing said film cartridge from being inserted into said film chamber along a direction perpendicular to the shaft of the film cartridge, thereby allowing the film cartridge to be obliquely inserted into the film chamber so that an end portion of the film cartridge overreaches said block member and leading said film cartridge so that said shaft of the film cartridge is fitted into said rewinding member; and
   a space of said film chamber for facilitating the insertion of said film cartridge into said film chamber over said block member, said space being formed in an end portion of said film chamber positioned on a side thereof opposite said rewinding member.

12. A mechanism as claimed in claim 11, wherein said block member is formed as one body with said camera body.

13. A mechanism as claimed in claim 11, wherein said end portion of said film chamber is curved outwardly so as to provide said space.

* * * * *

UNITED STATES PATENT AND TRADEMARK OFFICE
CERTIFICATE OF CORRECTION

PATENT NO. : 5,177,518

DATED : January 5, 1993

INVENTOR(S) : Toshihiko TANIGUCHI ET AL

It is certified that error appears in the above-identified patent and that said Letters Patent is hereby corrected as shown below:

On the title page

In Section [75], delete "Hunichi" and insert -- Junichi --.

Signed and Sealed this

Twenty-sixth Day of October, 1993

Attest:

BRUCE LEHMAN

Attesting Officer

Commissioner of Patents and Trademarks